US012050599B1

(12) United States Patent
Garcia-Sanchez et al.

(10) Patent No.: US 12,050,599 B1
(45) Date of Patent: Jul. 30, 2024

(54) INTELLIGENT KNOWLEDGE-BASED QUESTION ANSWERING SYSTEM

(71) Applicant: Need2Say, LLC, Irvine, CA (US)

(72) Inventors: Oscar Rafael Garcia-Sanchez, Irvine, CA (US); Longjun Li, Leeds, AL (US)

(73) Assignee: Need2Say, LLC, Irvine, CA (US)

( * ) Notice: Subject to any disclaimer, the term of this patent is extended or adjusted under 35 U.S.C. 154(b) by 0 days.

(21) Appl. No.: 18/497,624

(22) Filed: Oct. 30, 2023

(51) Int. Cl.
*G06F 16/242* (2019.01)
*G06F 16/2457* (2019.01)

(52) U.S. Cl.
CPC ...... *G06F 16/243* (2019.01); *G06F 16/24578* (2019.01)

(58) Field of Classification Search
CPC ........ G06F 40/30; G06F 18/22; G06F 16/951; G06F 16/93; G06F 16/24578; G06F 16/248; G06F 16/9538; G06N 20/00; G06N 5/022; G06N 3/0475
See application file for complete search history.

(56) References Cited

U.S. PATENT DOCUMENTS

| | | | | |
|---|---|---|---|---|
| 11,775,767 B1* | 10/2023 | Liu | ............ | G06F 16/3344 704/9 |
| 2004/0215607 A1* | 10/2004 | Travis, Jr. | ............ | G06F 16/9538 |
| 2013/0226907 A1* | 8/2013 | Wolf | ............ | G06F 16/951 707/722 |
| 2020/0210426 A1* | 7/2020 | Araki | ............ | G06F 16/9538 |

* cited by examiner

*Primary Examiner* — Hau H Hoang
(74) *Attorney, Agent, or Firm* — Maynard Nexsen PC; Brian T. Sattizahn, Esq.

(57) ABSTRACT

A question answering system is provided that can be used to supply workers at a jobsite with relevant answers or information for situations occurring at the jobsite. The question answering system can include a knowledge base with different types of content that are related to situations that may occur at the jobsite. When a user submits a query to the question answering system, the system can then determine whether an appropriate response to the query is contained in the knowledge base. If the knowledge base does not have an appropriate response, then the system submits the query to a third party information source such as a generative artificial intelligence tool for an answer. The system then analyzes the response from the third party information source and selects either the response from the third party information source or the response from the knowledge base to provide to the user.

20 Claims, 11 Drawing Sheets

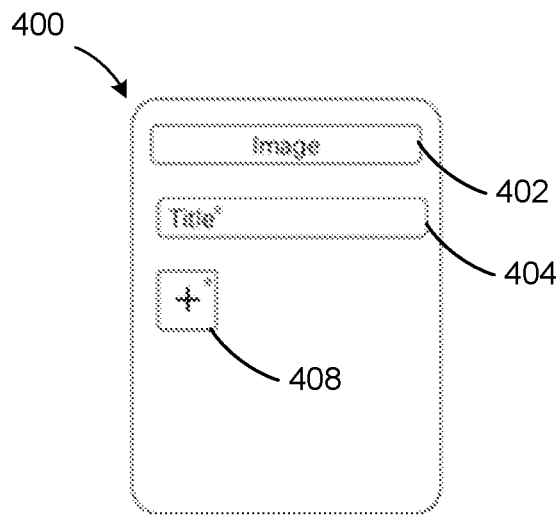
FIG. 5C
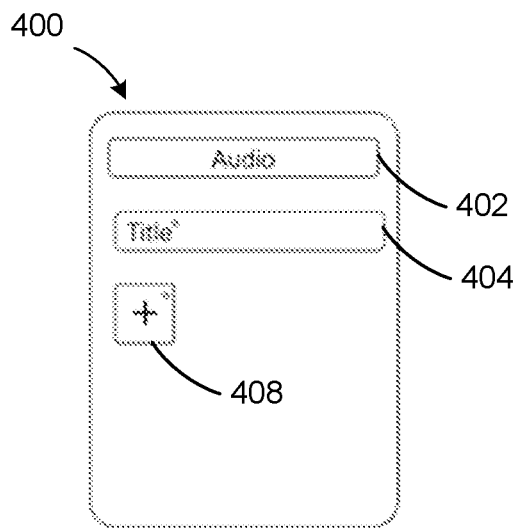 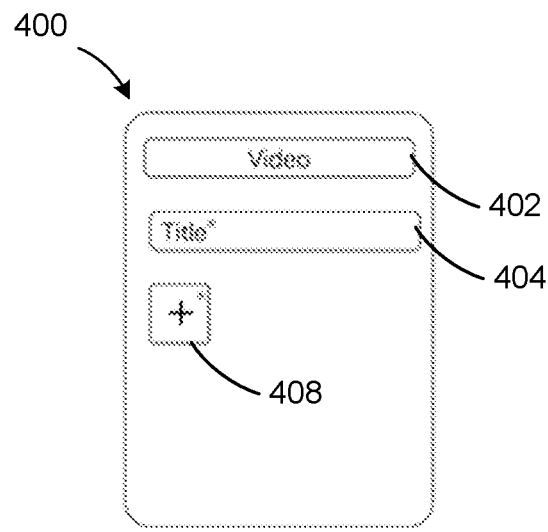
FIG. 5D            FIG. 5E

INTELLIGENT KNOWLEDGE-BASED QUESTION ANSWERING SYSTEM

BACKGROUND

The present application generally relates to a jobsite information system. More specifically, the present application is directed to an intelligent, knowledge-based question answering system that can provide relevant answers to situations occurring at the jobsite.

Every company in the trades industry (e.g., the construction industry, the plumbing industry, the electrical contractor industry, the heating, ventilation and air conditioning (HVAC) industry and the mechanics industry) possesses an abundance of data such as private user information, industry data accumulated by the company, product data, production line statistics, market data, safety data, cost data, budget data, and financial data. Access to this company information can enable workers at a jobsite to more efficiently and safely complete their tasks at the jobsite. However, the company's information is not typically available in applications (e.g., a generative artificial intelligence (AI) tool such as ChatGPT) that may be used by the workers at a jobsite when the worker is confronted with a particular situation at the jobsite. Thus, a trades industry company wanting to provide information to their workers, via an artificial intelligence application or tool that can respond to questions from the workers, has to figure how to safely and effectively incorporate their company data, information and resources into the artificial intelligence application.

One approach is to directly incorporate the company's data into an existing generative AI tool to permit the generative AI tool to be trained with the company data. Although this approach enables the generative AI tool to better align with the company's applications and leverage the company's data more efficiently, the addition of company data to the generative AI tool can introduce several problems and concerns for the company. For example, incorporating company data into a generative AI tool can raise security concerns regarding the disclosure of proprietary company data. Additionally, the company's data can encompass various modalities such as text, images, videos, temporal data, and knowledge bases, thereby possibly resulting in an incomplete or inaccurate incorporation of the company data into the learning outcomes of the generative AI tool. The incomplete and/or inaccurate incorporation of the company data into the generative AI tool can result in the generative AI tool providing incomplete or inaccurate responses to worker questions or queries, which can affect the safety and/or productivity of the worker.

SUMMARY

The present application is directed to a jobsite information system that assists trade industry companies (e.g., construction companies) in providing information to workers at a jobsite via the safe and efficient utilization of generative AI tools. The jobsite information system includes a question answering system that can provide workers at a jobsite with relevant answers or information in response to queries or questions submitted by the workers relating to operations or situations at the jobsite. The question answering system enables rapid access to internal company data through the comprehension capabilities of language models. The question answering system can also utilize the general knowledge from a generative AI tool to solve work-related challenges at a jobsite, thus optimizing workflow and enhancing work efficiency.

The question answering system can leverage multiple methods for extracting data features from the company's data, thereby effectively storing multimodal data such as text, files, images, audio, and videos in a unified database within a specific domain that can then be used to formulate responses to user questions or queries. The use of a unified database can establish a dedicated knowledge repository tailored to the needs of the particular trade industry (e.g., construction) company. An integrated approach utilizing vector and keyword approximations can be employed by the question answering system to determine the relevance of queries or questions (submitted by the workers) to the company's resources (as stored in the unified database). If the company information from the unified database does not satisfy a relevance threshold for a particular question, the question answering system can submit the question to an external answer source (e.g., a generative AI tool) for a response. The response from the external answer source can be utilized by the question answering system to either perform a secondary verification of the response from the unified database or to serve as the actual response from the question answering system, thereby enabling the seamless integration of the external answer source (or generative AI tool) into the question answering system. Lastly, the determined results to the worker's question (either from the unified database or the external answer source) undergo language restructuring and compliance review using a large language model. The question answering system can exhibit high levels of security, efficiency, and accuracy, and provide administrators and employees (or workers) with essential consultative information to facilitate the work at the jobsite in an efficient and secure manner.

One advantage of the present application is an internal data storage arrangement that permits the question answering system to have quick and equal access to multimodal data when formulating responses to worker questions.

Another advantage of the present application is the providing of secure and efficient information retrieval and intelligent question-answering functionality to workers at a jobsite that utilizes both the proprietary data of the company and the general knowledge of generative AI tools.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

FIGS. 5A-5E are schematic diagrams showing embodiments of the interface for a user to enter additional information when uploading information to the knowledge base.

Wherever possible, the same reference numbers are used throughout the drawings to refer to the same or like parts.

DETAILED DESCRIPTION

Figure 1:
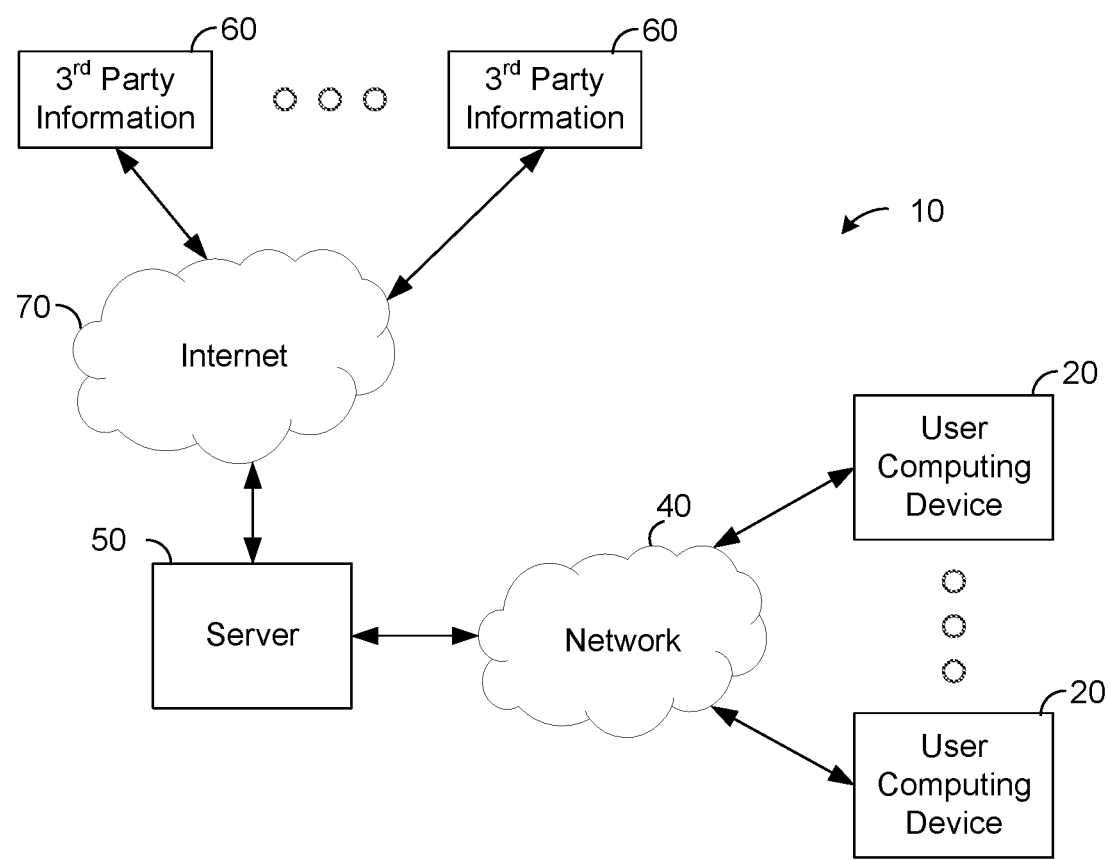
FIG. 1 is a block diagram showing an embodiment of a jobsite information system.

FIG. 1 shows an embodiment of a jobsite information system 10. The jobsite information system 10 can be used to provide information to users (i.e., the workers located at the jobsite) in the construction industry or a similar type of industry or trade (e.g., the mechanics or vehicle maintenance industry) in response to particular situations or issues that may occur at the jobsite. With regard to the construction industry, the users of the jobsite information system 10 can include general contractors, masons, carpenters, electricians, plumbers, roofers, sheet metal workers, painters, drywall installers, tile setters, ironworkers, concrete finishers, heavy equipment operators, glaziers, flooring installers, insulation workers, heating, ventilation and air conditioning (HVAC) technicians, surveyors, tapers (or finishers), landscapers, elevator installers and repairers, boilermakers, piledrivers and welders. The users can submit questions, queries, inquiries or other requests for information to a server computer 50 of the jobsite information system 10 via user computing devices 20 that are carried by the users. In one embodiment, the user computing device 20 can be a portable electronic device such as a smartphone, smart watch, tablet computer, laptop computer, etc. that can be carried and used by the user at the jobsite. The user computing devices 20 can communicate (e.g., send and receive messages, information and/or data) with the server computer 50 via a network 40. In one embodiment, the network 40 can be any suitable network for communicating data between locations, such as the Internet, local area networks, wide area networks, cellular networks, any other suitable communication network, or any combination thereof.

The server computer 50 receives the questions or requests for information from the user computing devices 20, processes and analyzes the questions or requests with a question answering system, and provides the answers or information generated by the question answering system back to the user computing device 20. The answers or information provided to the users by the server computer 50 can be based on one or more of the internal knowledge of the server computer 50 (i.e., knowledge, data or information located or obtained at the server computer 50) and external knowledge to the server computer 50 (i.e., knowledge, data or information obtained from third ($3^{rd}$) party information sources 60 via the Internet 70). In one embodiment, $3^{rd}$ party information sources 60 can include industry databases or reference sources, government databases or reference sources, generative artificial intelligence (AI) tools (e.g., ChatGPT from Open AI or Gemini from Google), other AI or machine learning tools and other suitable information sources or tools. The user can then review the provided answer or information from the question answering system of the server computer 50 and use the answer or information, as needed and/or appropriate, to respond to particular situations or issues at the jobsite.

Figure 2:
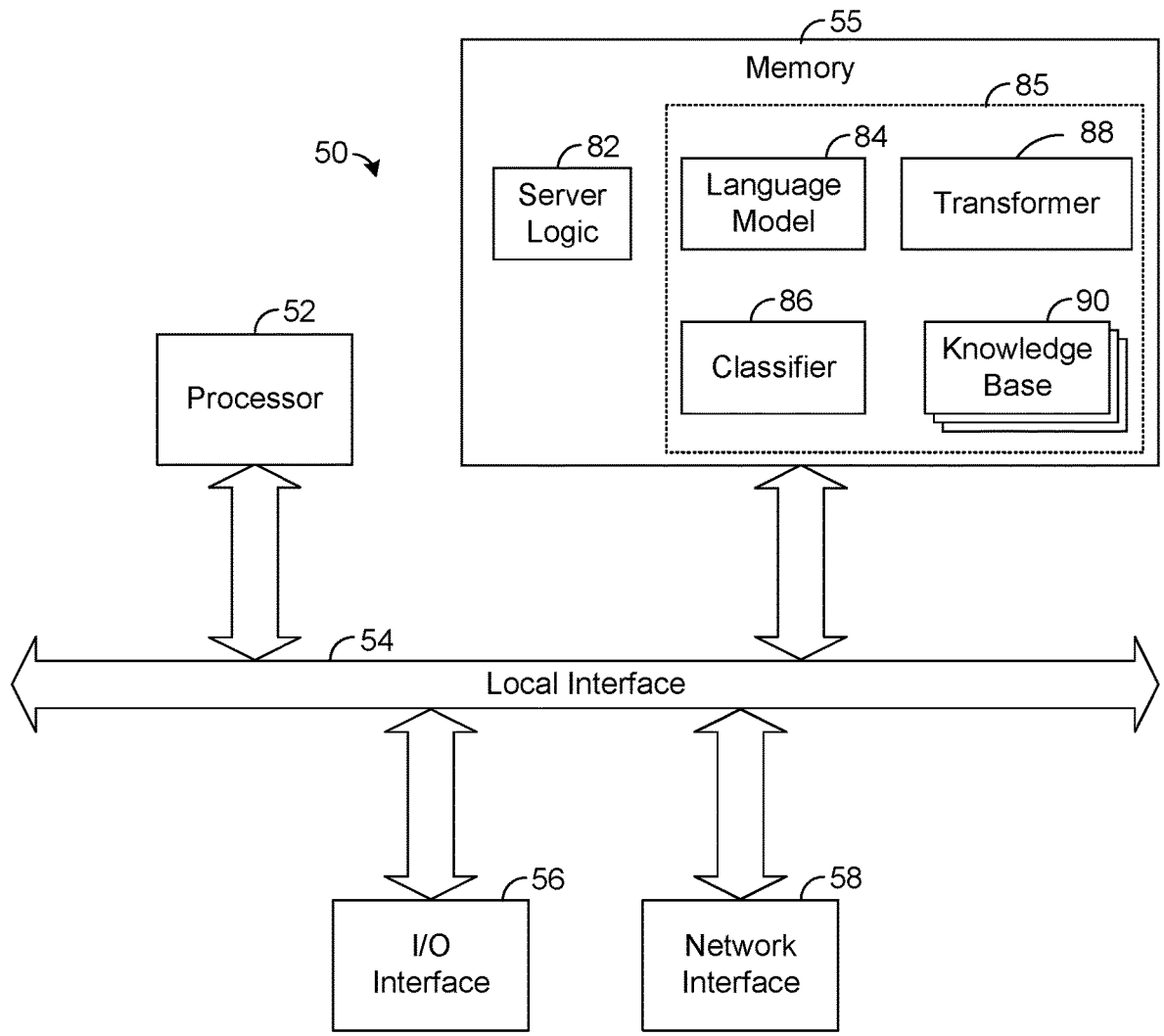
FIG. 2 is a block diagram showing an embodiment of the sever computer from FIG. 1.

FIG. 2 shows an embodiment of the server computer 50. The server 50 can include server logic 82 for generally controlling the operation of the server 50 and a question answering system 85 to respond to questions or requests submitted by users. The question answering system 85 of the server 50 also includes logic 84, referred to herein as "a language model," logic 86, referred to herein as "a classifier," and logic 88, referred to herein as "a transformer." The language model 84 can be used to provide outputs to the user (e.g., the answers or information provided in response to the user's questions) in natural human language. The classifier 86 can be used to analyze the user's question and generate the appropriate answer or information (to be provided to the user) based on information or data from the knowledge base 90 and/or the $3^{rd}$ party information sources 60. The transformer 88 can be used to take inputs to the server 50 (e.g., questions submitted by the users or data or information to be stored in the knowledge base 90) and generate one or more vectors corresponding to the input. In other embodiments, the language model 84, the classifier 86, and/or the transformer 88 can be combined with the server logic 82 or with one another. The server logic 82, the language model 84, the classifier 86, and the transformer 88 can be implemented in software, hardware, firmware or any combination thereof. In the server 50 shown by FIG. 2, the server logic 82, the language model 84, the classifier 86, and the transformer 88 can be implemented in software and stored in memory 55. However, other configurations of the server logic 82, the language model 84, the classifier 86, and the transformer 88 are possible in other embodiments.

Note that the server logic 82, the language model 84, the classifier 86, and the transformer 88, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The server 50 can include at least one conventional processor 52, which includes processing hardware for executing instructions stored in the memory 55. As an example, the processor 52 may include a central processing unit (CPU) or a digital signal processor (DSP). The processor 52 communicates with and drives the other elements within the server 50 via a local interface 54, which can include at least one bus. As an example, when the server logic 82, the language model 84, the classifier 86, and/or the transformer 88 are implemented in software, the processor 52 may execute instructions of the server logic 82, the language model 84, the classifier 86, and/or the transformer 88 to perform the functions ascribed herein to the corresponding components. The server 50 can also include an input/output (I/O) interface 56 to receive inputs from a user of the server 50 and to provide outputs to a user of the server 50 as may be desired. A network interface 58 can be used to communicate with the networks 40 and 70 to enable communications between the server 50 and the user computing devices 20 and the $3^{rd}$ party information sources 60.

Figure 3:
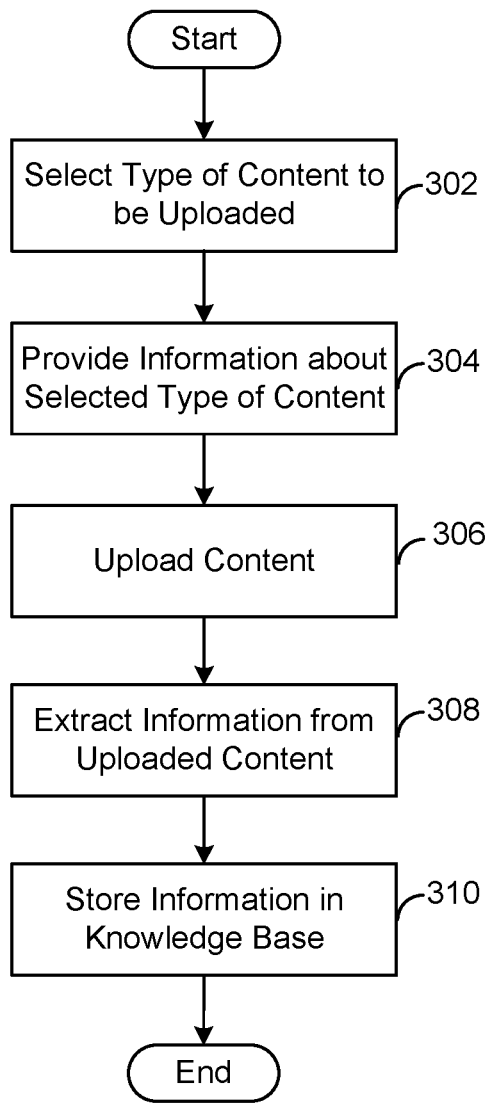
FIG. 3 is a flow diagram showing an embodiment of a process for uploading content or information into a knowledge base or repository.

FIG. 3 is directed to an embodiment of a process for uploading content, data and/or information into the knowledge base 90 of the question answering system 85 for subsequent use by the classifier 86 in providing answers and information in response to user questions or queries. The uploading process of FIG. 3 can be used to initially populate the knowledge base 90 and subsequently update the knowledge base 90 as new information, data and/or content becomes available. The uploading process begins with a user selecting the type of content to be uploaded into the knowledge base 90 of the server 50 (step 302). In an embodiment, the type of content that can be stored in the knowledge base 90 can include text (e.g., notes, emails, notifications, etc.), files or documents (e.g., files using DOC or PDF formats), images (e.g., images using a JPG or PNG format, an image extracted from a GIF formatted file or images from other suitable image formats), audios (e.g., audios using MP3, WAV or other suitable audio formats) and videos (e.g., videos using AVI, MP4, MOV or other suitable video formats). However, in other embodiments, other types of content, data or information can be loaded into the knowledge base 90.

Figure 4:
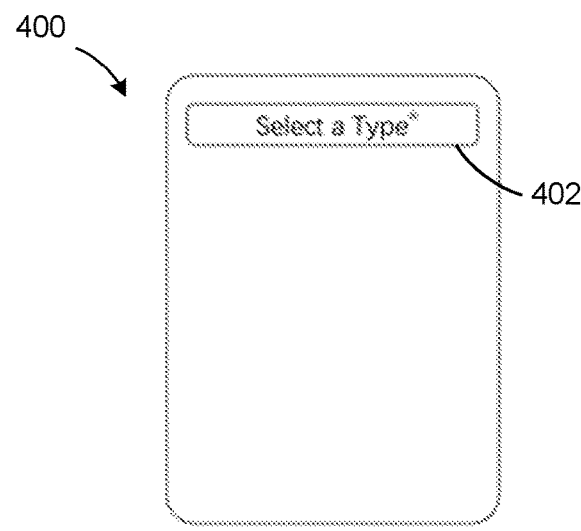
FIG. 4 is a schematic diagram showing an embodiment of an interface for a user to enter the content type when uploading information to the knowledge base.

To assist the user in uploading content to the knowledge base 90, an interface 400 (see FIG. 4) can be provided to the user. The interface 400 can be provided on a display of the server computer 50 or the interface can be provided in the user computing device 20 or other computing device in communication with the server 50. FIG. 4 shows an embodiment of the interface 400 for the user to select the type of content to be uploaded. The interface 400 can provide a field 402 for the user to enter the type of content. In one embodiment, the type field 402 can include a drop-down menu that permits the user to select a type of content from a preselected list of possible content types. In another embodiment, the user can manually enter into the type field 402 (via a keyboard or other similar data entry device) the type of content to be uploaded.

Figure 5A:
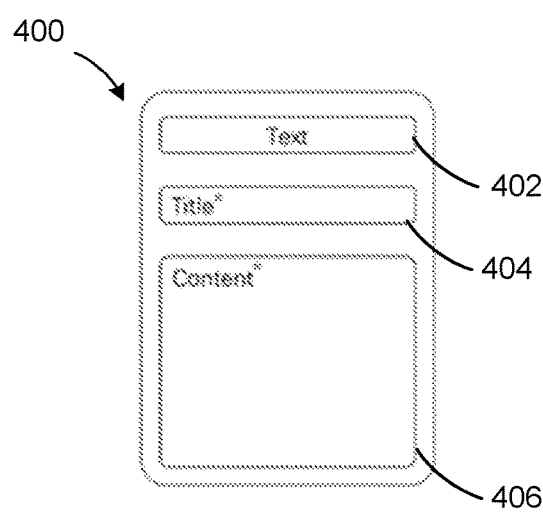
Figure 5B:
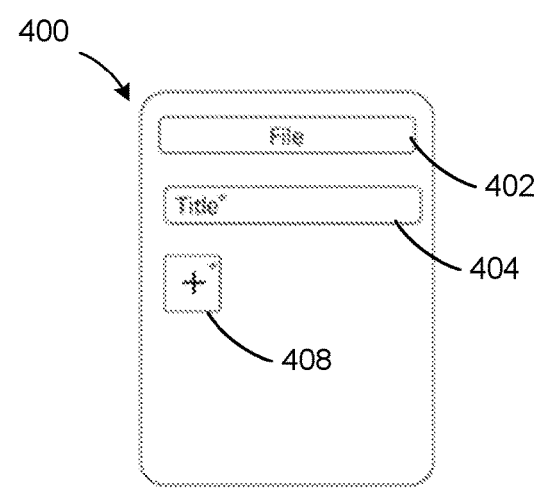

Referring back to FIG. 3, after the user has selected the type of content to be uploaded, the user can then provide additional information about the selected type of content to be uploaded (step 304). In one embodiment, the user can enter a title into field 404 (see FIGS. 5A-5E) for the content to be loaded via a keyboard or other similar data entry device. In addition, the user can include additional information related to the type of content to be uploaded. For example, the user can be provided with a text entry field 406 upon selecting "text" as the type of content to be uploaded (see FIG. 5A). The user can then enter the corresponding text for the content into the text entry field 406 via a keyboard or other similar data entry device. The user can also be provided with a file or link entry field 408 upon the user selecting: "file" as the type of content to be uploaded (see FIG. 5B); "image" as the type of content to be uploaded (see FIG. 5C); "audio" as the type of content to be uploaded (see FIG. 5D) or "video" as the type of content to be uploaded (see FIG. 5E). The user can then either attach the corresponding file via file entry field 408 or provide a link or path to the file in file entry field 408. After providing the information about the selected type of content into the interface 400, the user can then upload the content to the server 50 (step 306).

Once the content has been uploaded to the question answering system 85 of the server 50, the transformer 88 can extract information from the uploaded content (step 308). In one embodiment, the transformer 88 can incorporate one or more sequence to sequence neural network architectures or other similar types of neural networks or machine learning models to extract feature vectors from the multimodal data of the uploaded content. The feature vectors can be generated from one or more of the following techniques: text feature extraction; file or document feature extraction; image feature extraction; audio feature extraction; and video feature extraction. The specific techniques used to generate the feature vectors can be dependent on the type of content that has been uploaded.

In some embodiments, the transformer 88 can an include encoders and decoders. The encoders can extract the features from the input content or data, while the decoders can explain or reproduce the extracted features in the feature vector. For example, when processing an image input, the encoder can use convolution to obtain a 2D feature tensor. The 2D feature tensor can then be transformed into a 1D feature tensor using resize functions. Subsequently, the 1D feature tensor is provided as an input to the decoder and the 1D feature tensor can traverse the neural network of the decoder (or be processed by the decoder) to generate an output result from the decoder based on the 1D feature tensor. The output result from the decoder can be in the form of text, audio, or even images, depending on the nature of the training data used with the decoder.

In one embodiment, the transformer 88 can include an encoder to process multimodal data. The encoder can include a computer vision model 646 (see e.g., FIG. 6C) that converts image data to text and a speech model (see e.g., FIG. 6D) that converts audio data into text. The transformer 88 can also include a decoder that obtains the feature vectors from the text data that was generated from the conversion of the image data and/or the audio data. The decoder of the transformer 88 can be trained using classified text data, which results in closer distances between feature vectors with similar text content.

FIGS. 6A-6E are directed to schematic diagrams showing how the transformer 88 (e.g., using an encoder and decoder) generates feature vectors from the different types of content using embedding. The embedding technique of the transformer 88 can place content samples within a hypersphere, which enables similar content to be grouped together and pushes dissimilar content further apart. In an embodiment, the embedding of the content (e.g., the text from FIG. 6A) involves the mapping of discrete, categorical variables (associated with the content) to a feature vector. The feature vector can include a plurality of numbers that are used to represent the content. Further, the embedding of the content with the neural network(s) of the transformer 88 can provide low-dimensional, learned continuous vector representations of the discrete variables associated with the content. The neural network embedding of the transformer 88 can reduce the dimensionality of categorical variables and meaningfully represent categories of the content in the feature vector. The embedding of the content into a feature vector can enable the visualization of concepts and relations between the categories of variables in the content and enable the finding of the nearest neighbors to a particular feature vector in the knowledge base 90.

Figure 6A:
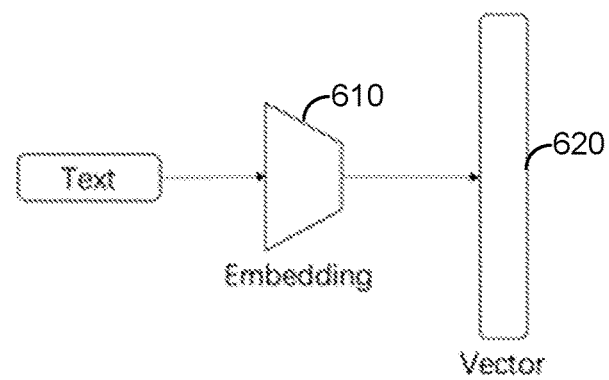
FIGS. 6A-6E are schematic diagrams showing embodiments of how the transformer generates feature vectors from the different types of content.
Figure 6B:
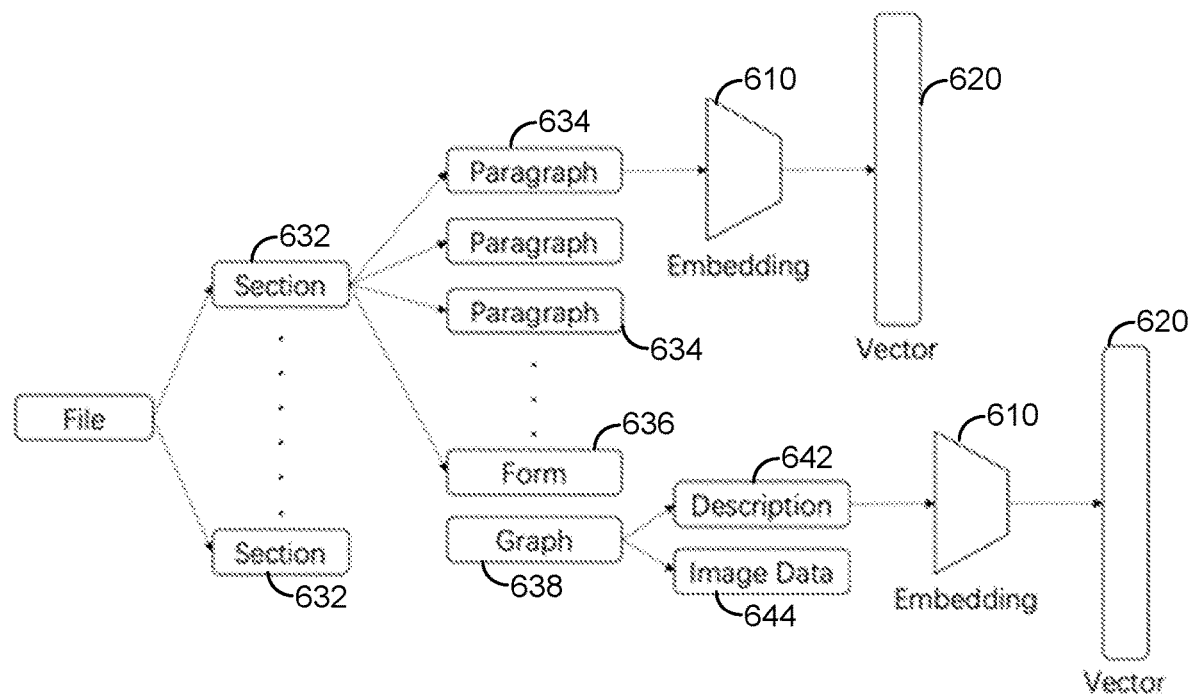

If the uploaded content is text, the transformer 88 can directly use an embedding process 610 to extract or generate a feature vector 620 as shown in FIG. 6A. If the uploaded content is a file (or document), the transformer 88 has to divide the file into more manageable sections or portions before using the embedding process 610 to extract the feature vectors 620 as shown in FIG. 6B. As shown in FIG. 6B, the transformer 88 can divide the file into sections 632. Each section 632 can be further subdivided into paragraphs 634, tables or forms 636, and graphs 638. In an embodiment, the tables or forms 636 and the graphs 638 can be considered a type of image. For the paragraphs 634, the embedding process 610 can be employed on the text of the paragraph to extract feature vectors 620. As for the table or form data 636 and the graph data 638, both have to be broken down into a descriptive textual context 642 that is based on the description provided by the image and image data 644. The embedding process can then be performed on the descriptive textual content 642 (which provides sufficient details about the table or form data 636 or the graph data 638) to generate the feature vectors 620. The image data 644 generated from the table or form data 636 or the graph data 638 can still be stored as part of the table or form data 636 or the graph data 638 and provided to a user in response to a query.

Figure 6C:
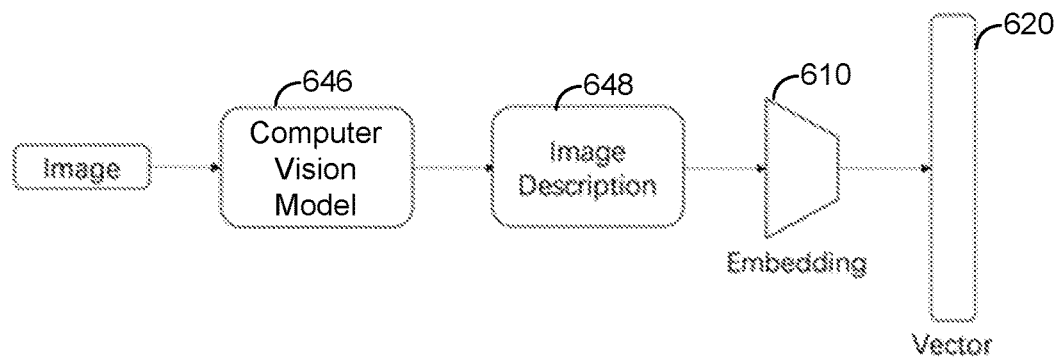

If the uploaded content is an image, the transformer 88 has to process the image before using the embedding process 610 to extract the feature vectors 620 as shown in FIG. 6C. The image can processed with a computer vision model 646 to extract an image description 648 (i.e., a text representation of the image file). In one embodiment, the computer vision model 646 can be CLIP (Contrastive Language-Image Pre-training), but other computer vision models may be used in other embodiments. The embedding process 610 can then be performed on the image description 648 to generate the feature vector 620.

In an embodiment, the computer vision model 646 is a model that learns to understand images and text by associating the images and text with each other. The computer vision model 646 can use a contrastive learning approach, where the model is trained on a large dataset of image-text pairs. During training, the computer vision model 646 jointly trains an image encoder and a text encoder to predict the correct pairings of a batch of (image, text) training examples and learns to encode both the images and their corresponding textual descriptions into a joint embedding space, where similar images and texts are closer together. The placement of similar images closer together can be achieved through a process called "contrastive loss," which encourages the model to pull similar pairs closer while pushing dissimilar pairs apart. The computer vision model 646 can create a dataset classifier from the label text of the target image. The text encoder of the computer vision model 646 can then synthesize a zero-shot linear classifier by embedding the names or descriptions of the target image's class(es).

Figure 6D:
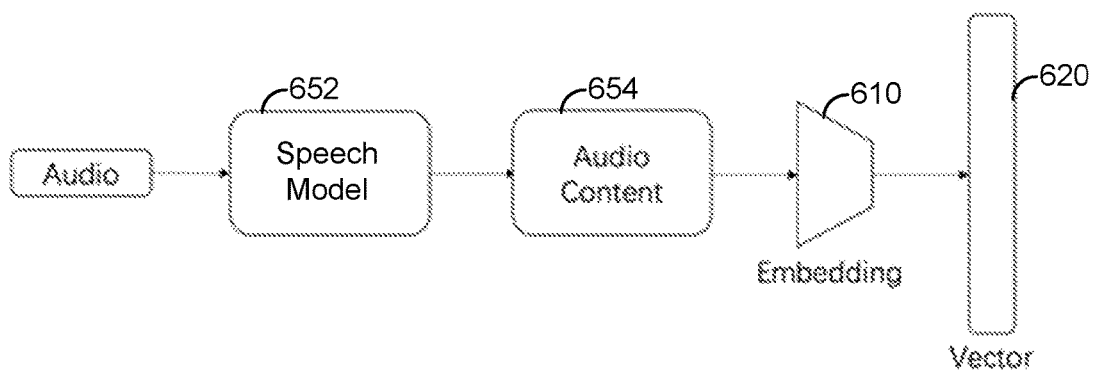

If the uploaded content is audio, the transformer 88 has to process the audio before using the embedding process 610 to extract the feature vectors 620 as shown in FIG. 6D. The audio can be processed with a speech model 652 that can perform automatic speech recognition and speech translation to extract an audio description 654 (i.e., a text version of the audio file). In one embodiment, the speech model 652 can be Whisper, but other speech models may be used in other embodiments. The embedding process 610 can then be performed on the audio description or content 654 to generate the feature vector 620.

In an embodiment, the speech model 652 is trained for speech recognition and translation tasks and can transcribe speech audio into text. The speech model 652 transcribes audio into text in the language in which it was spoken or into text that has been translated to English. The speech model 652 can use an encoder-decoder model that is trained on many different speech processing tasks, including multilingual speech recognition, speech translation, spoken language identification, and voice activity detection. The multitask training format uses a set of special tokens that serve as task specifiers or classification targets. The input audio to the speech model 652 can be split into 30-second chunks, converted into a log-Mel spectrogram, and then passed into an encoder. The decoder is trained to predict the corresponding text caption via special tokens that direct the speech model 652 to perform tasks such as language identification, phrase-level timestamps, multilingual speech transcription, and to-English speech translation.

Figure 6E:
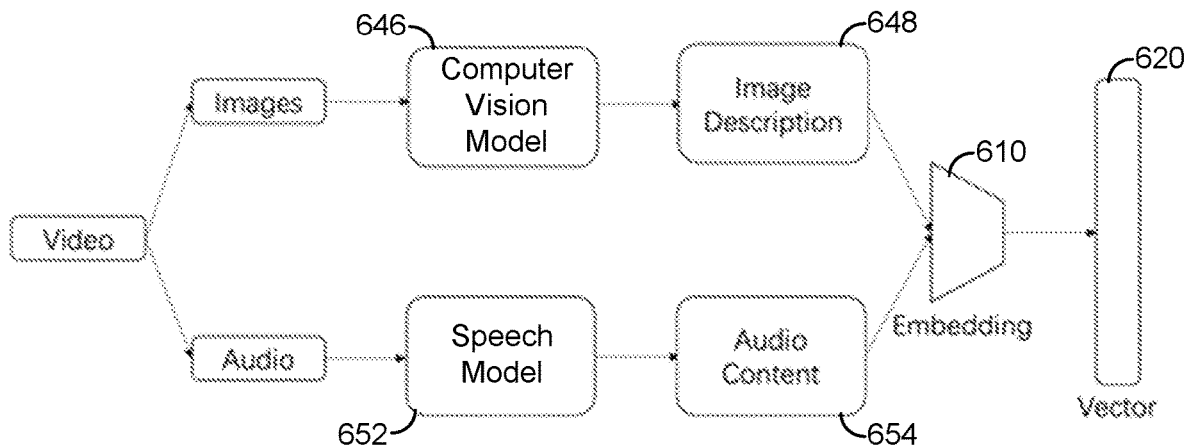

If the uploaded content is video, the transformer 88 has to process the video before using the embedding process 610 to extract the feature vectors 620 as shown in FIG. 6E. The transformer 88 can initially sample the video to separate the video into image data and audio or speech data. In one embodiment, the transformer 88 can use a multimedia processing suite (e.g., FFmpeg) to separate the video into audio data and image data. The multimedia processing suite can include a collection of libraries and executable programs that permit the encoding, decoding, transcoding, multiplexing, demultiplexing, streaming, and manipulating of audio and video files. The multimedia processing suite can be used to perform various operations on multimedia files, such as converting file formats, adjusting video and audio parameters, extracting streams, merging multiple files, etc. After the video has been separated into image data and audio data, the image data is partially processed as previously described with respect to FIG. 6C and the audio or speech data is partially processed as previously described with respect to FIG. 6D. The image description 648 generated from the image data and the audio description 654 generated from the audio data can both be provided to the embedding process 610, which may utilize an embedding network, to generate a feature vector for the video.

Figure 7:
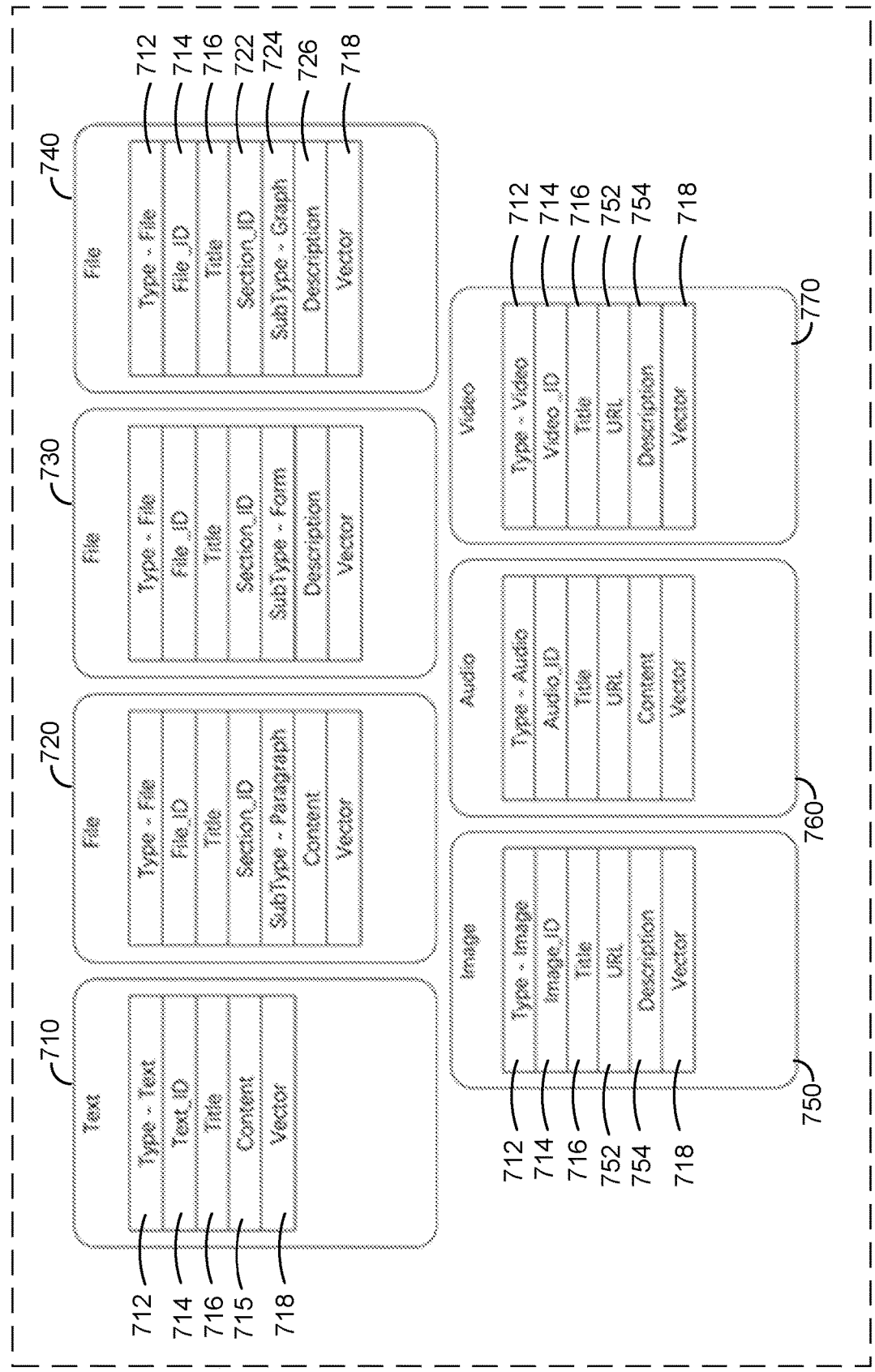
FIG. 7 is a schematic diagram showing an embodiment of the knowledge base with records associated with different content types.

Referring back again to FIG. 3, after the information is extracted from the uploaded content, the information can be stored in the knowledge base 90. The three primary components of each information item in the knowledge base 90 can include: 1) the title; 2) the textual data (i.e., text, descriptions of image and video data, and content of audio data); and 3) the corresponding vector, which can predominantly offer semantic information. In an embodiment, the actual uploaded content such as the text, documents or files, images, audio, and/or videos can be stored in a file database in memory 55, which may be part of the knowledge base 90. The extracted and/or uploaded information associated with the content (e.g., content type, identification or reference number, feature vectors, titles, file locations, etc.) can be stored in the knowledge base 90. FIG. 7 shows an embodiment of the knowledge base 90 with records for different types of content. Each time content is uploaded to the server 50, a corresponding record (or records) is stored in the knowledge base 90. As more content is uploaded to the server, the knowledge base 90 increases in size, thereby enabling the question answering system 85 to better generate responses to questions submitted by the workers. The knowledge base 90 can include a text record 710, a first file record (for paragraphs) 720, a second file record (for forms) 730, a third file record (for graphs) 740, an image file record 750, an audio file record 760 and a video file record 770.

Each of the records 710-770 includes a type field 712 that identifies the type of record (e.g., text, file, image, audio or video), an identifier field 714 that provides a unique identifier for the record, a title field 716 that provides the title for the content as entered by the user in the title field 404 and a vector field 718 that includes the vector generated for the content by the transformer 88. The text record 710 can also include a content field 715 that includes the text entered by the user into the text entry field 406. The file records 720-740 can include the type field 712, the identifier field 714, the title field 716 and the vector field 718. In addition, the file records 720-740 can also include a section identifier 722 to uniquely identify sections of the file (or document), a subtype field 724 to identify the type of section of the file (e.g., paragraph, form or graph) and either a content or description field 726 that includes either the text of the paragraph or the descriptive textual context 642 of the form or graph.

The image record 750, the audio record 760 and the video record 770 can include the type field 712, the identifier field 714, the title field 716 and the vector field 718. In addition, the image record 750, the audio record 760 and the video record 770 can also include a URL field 752 that provides a link or path to the corresponding image, audio or video and either a content or description field 754 that includes the audio content 654 (if an audio record 760), the image description 648 (if an image record) or both the audio content 654 and the image description 652, or some combination of the two, (if a video record 770). In another embodiment, the video record 770 can be divided into multiple records (similar to the handling of the file records 720-740) and include separate records for the audio portion of the video and the image portion of the video.

Figure 8:
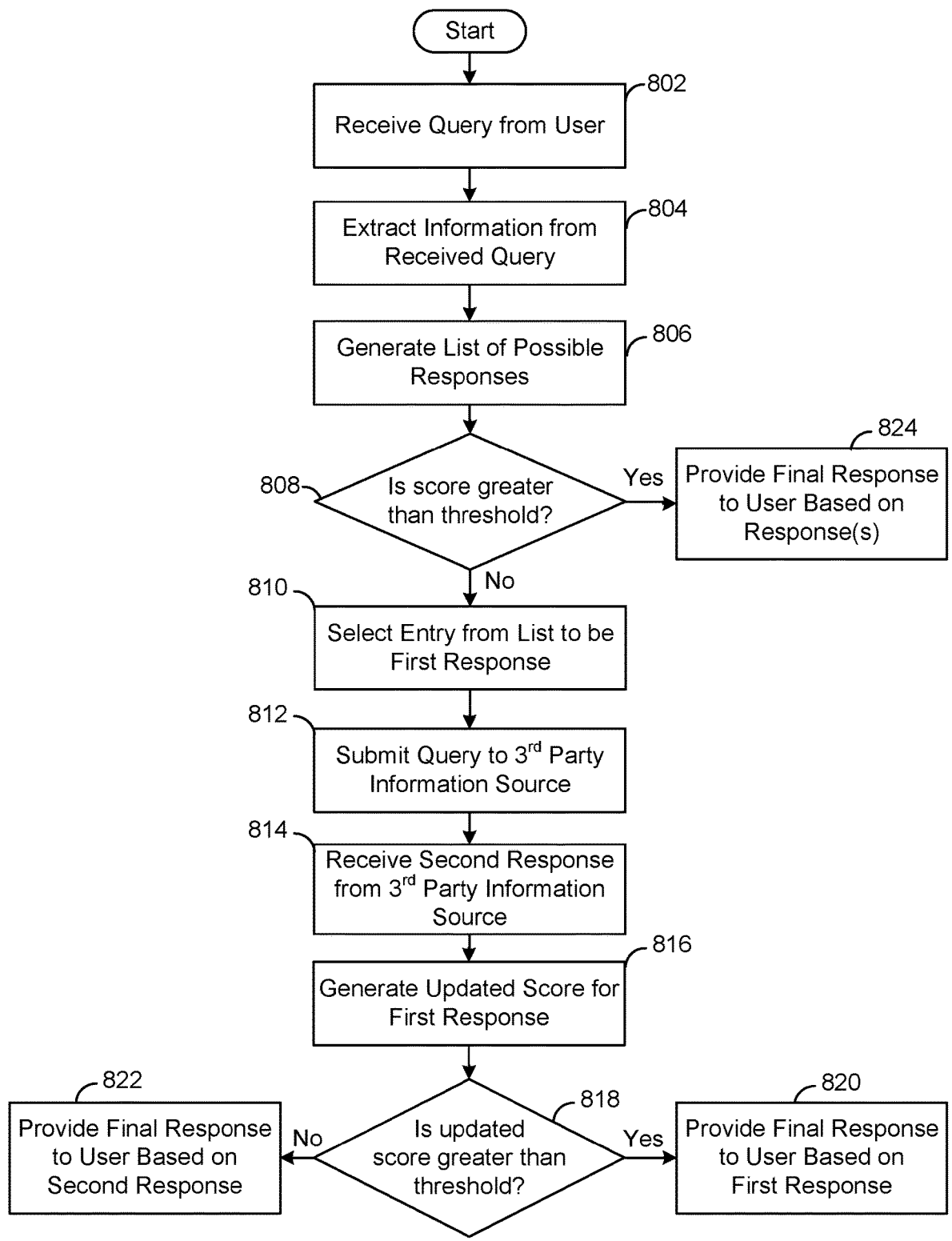
FIG. 8 is a flow diagram showing an embodiment of a process for answering questions received from the users.
Figure 9:
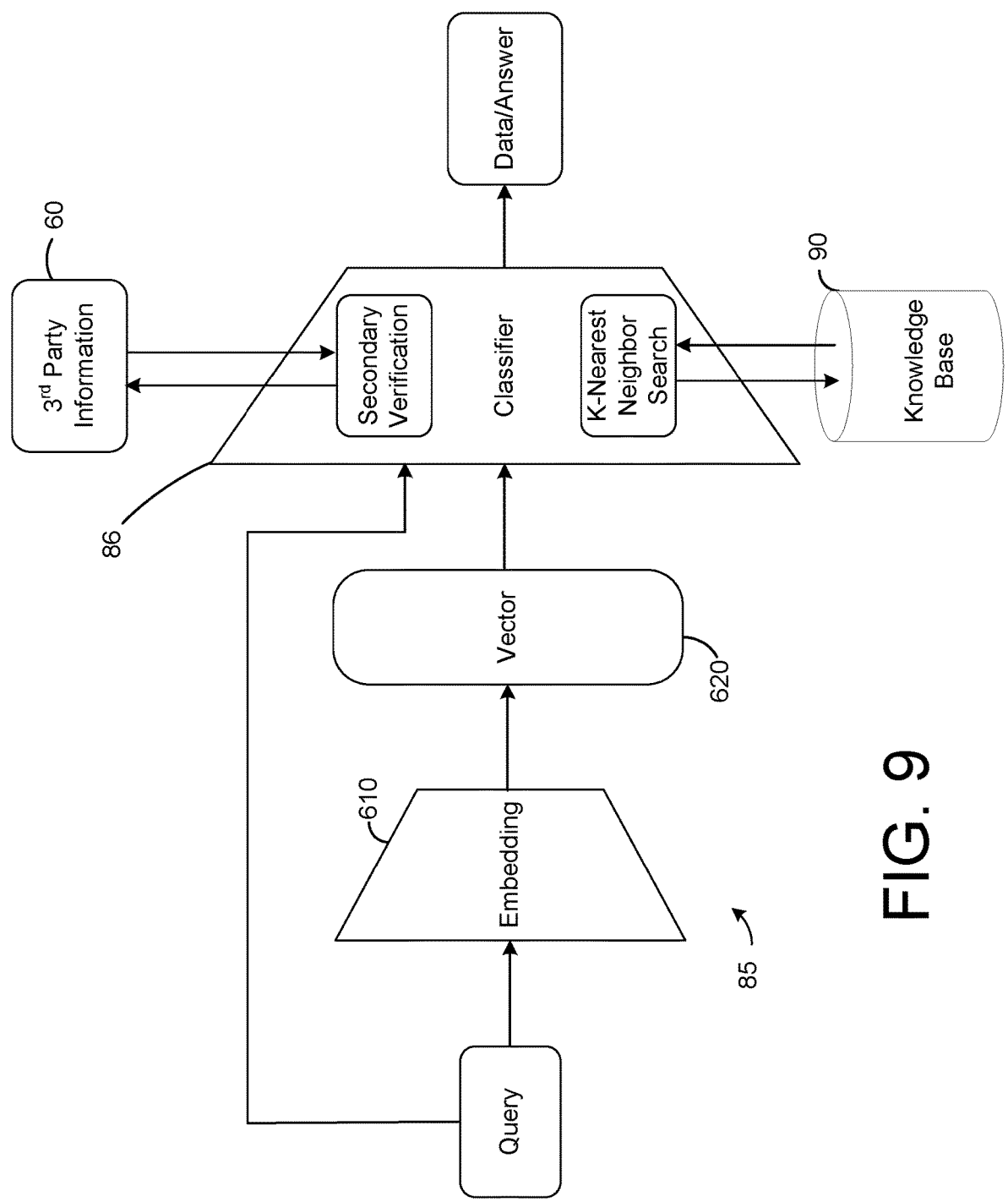
FIG. 9 is a schematic diagram showing an embodiment of how the classifier provides answers to user questions.

Once the content has been uploaded to the server 50 and stored in the knowledge base 90, the question answering system 85 can then be used to answer questions from the users. FIG. 8 is directed to an embodiment of a process for using the question answering system 85 to provide answers and information in response to user questions or queries. FIG. 9 schematically shows how the question answering system provides answers to user queries. The process begins with the question answering system 85 receiving a question, problem or query from a user (step 802) that requests an answer, solution or information in response. The question answering system 85 provides the received query to the transformer 88 and the transformer 88 extracts information (e.g., a feature vector 620) from the received query (step 804) via the embedding process 610.

Once the information from the received query has been generated, the information (i.e., the feature vector 620) and the query are provided to the classifier 86. The classifier 86 can then conduct a search of the knowledge base 90 to generate a list of possible responses or answers to the query based on the information in the knowledge base 90 (step 806). When generating the list of responses, the classifier 86 can determine similarities between the feature vector of the query and the feature vectors associated with the content stored in the knowledge base 90. In an embodiment, the user's query can be q, with a question vector $V_q$=Embed(q). The generation of the list of the responses by the classifier 86 involves the classifier 86 comparing $V_q$ with the stored feature vectors $V_i$ in the database D (i.e., knowledge base 90) to generate the initial list of possible responses. The classifier 86, as shown in FIG. 9, can utilize the K-Nearest Neighbors (KNN) method or search $f_K$ (or any other suitable method or technique such as SVM (support vector machine) methods, XGBoost (extreme gradient boosting) methods, or MLP (multilayer perceptron) methods, each of which may require additional training to work with the knowledge base 90) to identify a preselected number (e.g., 10) of data entries $D_n$ with corresponding distance determinations, as set forth in equation 1, to formulate the initial list of responses.

$$D_n = f_K(D) = \min_n \left( \frac{\sum_{j=0}^{m}(V_{qj} - V_{ij})^2}{m} \right) \quad (1)$$

Once the initial list of data entries D has been generated, the classifier 86 can then determine a problem relevance score S for each response or data entry in the initial list $D_n$ using equation 2.

$$S_i = -\alpha \log f_K(D_i) + \beta \log \cos(q, D_{i,title}) + \gamma \log \cos(q, D_{i,text}) \quad (2)$$

In equation 2, q is the query (or problem), $D_{title}$ is the title data of the response from the initial list of data entries $D_n$, $D_{text}$ is the text-type data of the response from the initial list of data entries $D_n$, $f_K$ is the KNN distance associated with the response (as determined when formulating the initial list $D_n$), $\alpha$, $\beta$ and $\gamma$ are weighting coefficients, and cos(x, y) represents the cosine similarity between x and y, which cosine similarity offers statistical measures about the content. In one embodiment, the weighting coefficients $\alpha$, $\beta$ and $\gamma$ are generated during the training process for the classifier 86 using sample questions and can be used to normalize the problem relevance score S to a range of [0.0, 1.0]. The cosine similarity of the texts is obtained through the following steps:1) a) filter out any stop words in both texts, b) extract the stems to obtain a collection of all the keywords in the sentence or paragraph from both texts (e.g., original_content={work, Monday, California} and question_content={work, Monday, Alabama}, and c) merge them into a unified keyword set (e.g., all_keyword={work, Monday, California, Alabama}); 2) generate frequency vectors for each text (e.g., original_content vector can be represented as (1, 1, 1, 0), and the question_content vector can be represented as (1, 1, 0, 1)); and 3) calculate the cosine similarity between the two vectors using equation 3.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad (3)$$

The classifier 86 can then compare the problem relevance score S of each response or data entry in the initial list $D_n$ to a threshold score (step 808). In an embodiment, the threshold score can be in the normalized range and can be 0.87. However, other thresholds may be used in other embodiments depending on the amount of data and/or sample size in the knowledge base 90. If the problem relevance score S for a particular response or data entry in the initial list $D_n$ is greater than the threshold score (i.e., $S_i \geq S_{threshold}$), then the classifier 86 can provide the response or data entry from the initial list $D_n$ (along with any other response or data entry in the initial list $D_n$ having a problem relevance score greater than the threshold score) to the user (step 824) as described in more detail below.

However, if none of the responses or data entries in the initial list $D_n$ have a problem relevance score S greater than the threshold score, then the classifier 86 can select one of the responses or data entries from the initial list $D_n$, based on the problem relevance score S for each of the responses in the initial list $D_n$, to be a first response (step 810). In an embodiment, the classifier 86 can select the response or data entry having the highest problem relevance score S (i.e., $S_{max}$) to be the first response. After the first response is determined, the classifier 86 performs a secondary verification of the first response by submitting the query q to one or more third party information sources 60 such a generative AI applications or tools (e.g., ChatGPT) for a response (step 812). The third party information source 60 can provide a second response to the query q along with a correlation coefficient $S_{genAI}$ (step 814). The correlation coefficient $S_{genAI}$ can be a value in the range [0.0, 1.0] that is used by the classifier 86 to determine (based on the second response provided by the third party information source 60) whether the first response is a relevant response to the user's query that wasn't reflected appropriately by the problem relevance score S calculated for the response (i.e., the secondary verification of the first response).

In an embodiment, when the third party information source 60 is a generative AI application, the generative AI application can be asked to provide a rating (i.e., a number between 0.0 and 1.0) of the relationship between the query and a preselected topic associated with the first response. In an embodiment, the preselected topic can be the title of the first response. However, in other embodiments, the preselected topic can be generated from other information associated with the first response. The rating returned by the generative AI application can be the correlation coefficient $S_{genAI}$. For example, a generative AI application can be asked a question such as "Is the following question related to construction? Please rate the relationship to the range [0.0, 1.0]. Please reply with only one number. An area to be tiled is 50 square feet. I have 5 boxes of square tile with each tile having a width of 12 inches. Do I have enough tile?" and return an answer or rating of 0.5, which returned rating of 0.5 would be the correlation coefficient $S_{genAI}$. In the above example, the preselected topic is construction and the query is "An area to be tiled is 50 square feet. I have 5 boxes of square tile with each tile having a width of 12 inches. Do I have enough tile?". Thus, the correlation coefficient $S_{genAI}$ can be independent of the score for the first response $S_i$. The classifier 86 can then generate an updated score for the first response (step 816) using equation 4.

$$S_i' = \theta_1 S_i + \theta_2 S_{genAI} \quad (4)$$

In equation 4, $\theta_1$ and $\theta_2$ are weighting coefficients that are used with problem relevance score S determinations based on equation 2. Once the updated score for the first response is determined, the classifier 86 can then compare the updated score $S_i'$ of the first response to a second threshold score $S_{threshold}'$ (step 818) to determine whether the first response is a relevant response to the user's query. In an embodiment, the second threshold score $S_{threshold}'$ can be independent of the (first) threshold score $S_{threshold}$. If the score $S_i'$ is greater than the second threshold score (i.e., $S_i' \geq S_{threshold}'$), then the classifier 86 can provide the first response to the user (step 820) as described in more detail below. However, if the score $S_i'$ is not greater than the threshold score, then the classifier 86 can provide the second response to the user (step 822).

Once the determination is made by the classifier 86 regarding the response to be provided to the user, the classifier 86 provides the determined response (i.e., the first response from step 820, the second response from step 822 or the response(s) having a problem relevance score S greater than the threshold score $S_{threshold}$ from step 824) and the query q to the language model 84. In an embodiment, the language model 84 can be a large language model (LLM), such as the LLaMa 2 (Large Language Model Meta Artificial Intelligence 2) model, fine-tuned by a LoRa (Low-Rank Adaptation) technique. In an embodiment, during the training of the language model 84, answer source data obtained from knowledge bases or third parties can be used as input and teacher-rewritten answers can be used as output. In addition, a moderation rate, as discussed in more detail below, can be incorporated in the training data. For example, the training data can be represented as follows: {"instruction": "xxxxxx", "input": "xxxxxx", "output": "xxxxxx", "moderation": 0.7}. The use of the LoRa technique in the language model 84 provides a simpler approach to train the LLM and does not alter any parameters of the original LLM, but instead adds a side branch network in the last layers to align the LLM with the training data.

Figure 10:
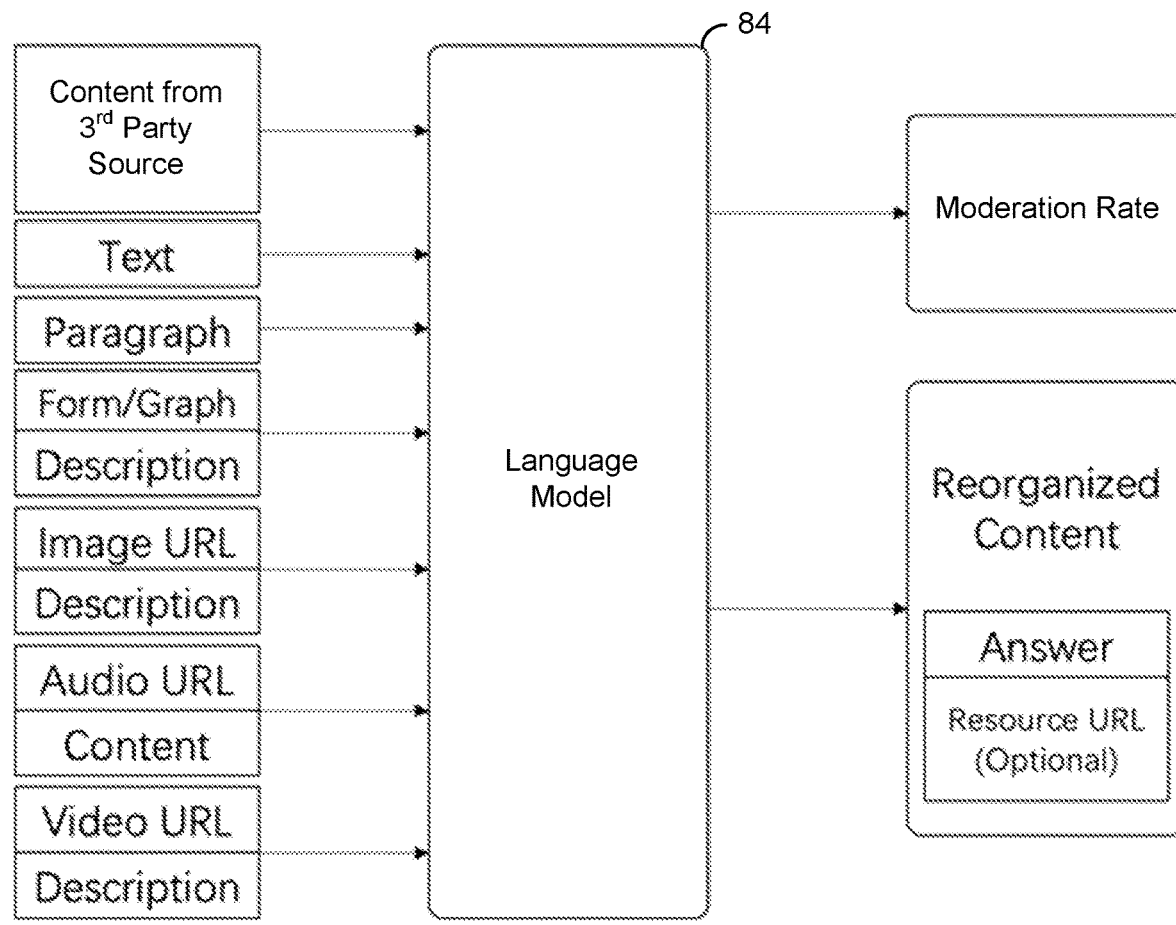
FIG. 10 is a schematic diagram showing an embodiment of how the language model provides an answer to a user.

The language model 84 can then reorganize the language into a final response and provide a moderation rate for the final response. The moderation rate is a value (e.g., a number in the range of [0.0, 1.0]) that provides an assessment of the "user-friendliness" of the final response. The moderation rate assists in the recognition of problematic content (e.g., content that expresses, incites, or promotes hate, harassment, violence, self-harm, sexual violence, etc.) in the final response so that the problematic content is not provided to the user. In an embodiment, problematic content in the final response is determined by comparing the moderation rate for the final response to a preselected threshold value (e.g., 0.5). If the moderation rate for the final response exceeds the preselected threshold value, the final response is not provided to the user and the user is provided with a preselected response (e.g., "I apologize, but I am unable to fulfill your request at this time. For additional support, please consider contacting your manager or supervisor for further guidance.") in response to the user's query. In another embodiment, each final response and moderation rate generated by the language model 84 can be used to further train and refine the language model 84 to provide more "user-friendly" responses in the future. In the final response provided to the user, if the response or answer originates from the knowledge base 90 and includes image, audio, or video data, the corresponding URLs for the image, audio, or video data can also be returned to the user. FIG. 10 schematically shows how the language model provides the answer from the classifier to the user.

Depending on the response(s) selected by the classifier 86, the language model 84 can either take the content from the $3^{rd}$ party source (which corresponds to the second response) as an input or information from one or more of the records 710-770 from the knowledge base 90. For example, if a text record 710 is selected, the language model 84 can receive the text entered by the user from the content field 715. If a paragraph record 720 is selected, the language model 84 can receive the text of the paragraph from the content or description field 726. If a form or graph record 730 or 740 is selected, the language model 84 can receive the actual form or graph and the descriptive textual context 642 of the form or graph from the content or description field 726. If an image, audio or video record 750-770 is selected, the language model 84 can receive either the audio content 654 or the image description 648 from the content or description field 754 and the link or path to the corresponding image, audio or video from the URL field 752.

The language model 84 can use the information associated from the response(s) and reorganize the information in a manner that makes the final response easier to understand by the user. The language model 84 can then provide the reorganized information or content to the user as a final response to the user's query. If a link or path was included in the URL field 752 (for images, audio or video), the language model 84 can also provide the link or path with the final response.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method of providing information to a user performing a task at a jobsite, the method comprising:
    populating a knowledge base with content related to the task performed by the user at the jobsite, wherein the content includes a plurality of different types of information;
    receiving, by a question answering system, a query from the user relating to the task being performed by the user;
    determining, by the question answering system, a plurality of first responses to the query based on the content populated in the knowledge base;
    determining, by the question answering system, whether at least one first response of the plurality of first responses is an appropriate answer to the query;
    providing, by the question answering system, the query to a third party information source upon a determination that the plurality of first responses do not provide an appropriate answer to the query;
    receiving, by the question answering system, a second response to the query from the third party information source;
    selecting, by the question answering system, one of a first response of the plurality of first responses or the second response using information provided by the third party information source; and
    providing, by the question answering system, the selected one of the first response of the plurality of first responses or the second response to the user, wherein providing the selected one of the first response of the plurality of first responses or the second response to the user includes providing the selected one of the first response of the plurality of first responses or the second response to a language model, the language model converts the selected one of the first response of the plurality of first responses or the second response into a final response and provides the final response to the user, and wherein providing the selected one of the first response of the plurality of first responses or the second response to the language model includes generating a moderation rate for the final response, the moderation rate is a value indicative of whether the final response includes problematic content.

2. The method of claim 1, wherein providing the selected one of the first response of the plurality of first responses or the second response to a language model includes comparing the moderation rate to a preselected threshold and providing an alternative response different from the final response to the user based on the comparing of the moderation rate.

3. The method of claim 1, wherein determining the plurality of first responses includes:
    generating a feature vector for the query from the user;
    comparing the feature vector for the query to corresponding feature vectors for each item of content in the knowledge base; and
    selecting the plurality of first responses based on the comparing of the feature vectors.

4. The method of claim 1, wherein determining whether at least one first response of the plurality of first responses is an appropriate answer to the query includes:
    calculating a score for each first response of the plurality of first responses;
    comparing the calculated score to a preselected threshold; and
    determining whether a first response of the plurality of first responses is an appropriate answer based on the comparing of the calculated score.

5. The method of claim 4, further comprising providing each first response of the plurality of first responses determined to be an appropriate answer to the language model, wherein the language model converts each of the provided first responses into the final response and provides the final response to the user.

6. The method of claim 4, further comprising:
    selecting a first response of the plurality responses to be a primary first response based on the calculated scores for the plurality of first responses; and
    wherein selecting one of a first response of the plurality of first responses or the second response includes selecting one of the primary first response or the second response.

7. The method of claim 1, wherein providing the query to a third party information source includes providing the query to a generative artificial intelligence tool.

8. A method of providing information to a user performing a task at a jobsite, the method comprising:
    populating a knowledge base with content related to the task performed by the user at the jobsite, wherein the content includes a plurality of different types of information;
    receiving, by a question answering system, a query from the user relating to the task being performed by the user;
    determining, by the question answering system, a plurality of first responses to the query based on the content populated in the knowledge base;
    determining, by the question answering system, whether at least one first response of the plurality of first responses is an appropriate answer to the query, wherein determining whether at least one first response of the plurality of first responses is an appropriate answer to the query includes:
        calculating a score for each first response of the plurality of first responses;
        comparing the calculated score to a preselected threshold; and
        determining whether a first response of the plurality of first responses is an appropriate answer based on the comparing of the calculated score;
    selecting a first response of the plurality responses to be a primary first response based on the calculated scores for the plurality of first responses;
    providing, by the question answering system, the query to a third party information source upon a determination that the plurality of first responses do not provide an appropriate answer to the query;
    receiving, by the question answering system, a second response to the query from the third party information source;

selecting, by the question answering system, one of the primary first response or the second response using information provided by the third party information source, wherein selecting one of the primary first response or the second response includes:
receiving a correlation coefficient from the third party information source, wherein the correlation coefficient is a value indicative of the relationship of the second response to the primary first response;
determining an updated score for the primary first response based on the correlation coefficient;
comparing the updated score to a second preselected threshold; and
selecting one of the primary first response or the second response based on the comparing of the updated score; and
providing, by the question answering system, the selected one of the primary first response or the second response to the user.

9. The method of claim 8, wherein providing the selected one of the first response of the plurality of first responses or the second response to the user includes providing the selected one of the first response of the plurality of first responses or the second response to a language model, wherein the language model converts the selected one of the first response of the plurality of first responses or the second response into a final response and provides the final response to the user.

10. The method of claim 9, wherein providing the selected one of the first response of the plurality of first responses or the second response to the language model includes generating a moderation rate for the final response, wherein the moderation rate is a value indicative of whether the final response includes problematic content.

11. A system to provide information to a user performing a task at a jobsite, the system comprising:
at least one server computer in communication with at least one user computing device used by the user, the at least one server computer comprising:
at least one processor;
a memory device storing a question answering system having logic and a knowledge base, the knowledge base storing content related to the task performed by the user at the jobsite, wherein the content includes a plurality of different types of information;
the logic comprising instructions that, when executed by the at least one processor, cause the at least one processor to:
receive a query relating to the task being performed by the user from the at least one user computing device;
determine a plurality of first responses to the query based on the content populated in the knowledge base;
determine whether at least one first response of the plurality of first responses is an appropriate answer to the query;
provide the query to a third party information source upon a determination that the plurality of first responses do not provide an appropriate answer to the query;
receive a second response to the query from the third party information source;
select one of a first response of the plurality of first responses or the second response using information provided by the third party information source; and
provide the selected one of the first response of the plurality of first responses or the second response to a language model, wherein the language model converts the selected one of the first response of the plurality of first responses or the second response into a final response and provides the final response to the user; and
generate a moderation rate for the final response, wherein the moderation rate is a value indicative of whether the final response includes problematic content.

12. The system of claim 11, wherein the logic further comprises instructions that, when executed by the at least one processor, cause the at least one processor to compare the moderation rate to a preselected threshold and provide an alternative response different from the final response to the user based on the comparison of the moderation rate.

13. The system of claim 11, wherein the logic further comprises instructions that, when executed by the at least one processor, cause the at least one processor to:
generate a feature vector for the query from the user;
compare the feature vector for the query to corresponding feature vectors for each item of content in the knowledge base; and
select the plurality of first responses based on the comparison of the feature vectors.

14. The system of claim 11, wherein the logic further comprises instructions that, when executed by the at least one processor, cause the at least one processor to:
calculate a score for each first response of the plurality of first responses;
compare the calculated score to a preselected threshold; and
determine whether a first response of the plurality of first responses is an appropriate answer based on the comparison of the calculated score.

15. The system of claim 14, wherein the logic further comprises instructions that, when executed by the at least one processor, cause the at least one processor to provide each first response of the plurality of first responses determined to be an appropriate answer to the language model, wherein the language model converts each of the provided first responses into the final response and provides the final response to the user.

16. The system of claim 14, wherein the logic further comprises instructions that, when executed by the at least one processor, cause the at least one processor to:
select a first response of the plurality responses to be a primary first response based on the calculated scores for the plurality of first responses; and
select one of the primary first response or the second response to provide to the user.

17. The system of claim 11, wherein the plurality of different types of information of the content includes one or more of text, images, audio or video.

18. A system to provide information to a user performing a task at a jobsite, the system comprising:
at least one server computer in communication with at least one user computing device used by the user, the at least one server computer comprising:
at least one processor;
a memory device storing a question answering system having logic and a knowledge base, the knowledge base storing content related to the task performed by the user at the jobsite, wherein the content includes a plurality of different types of information;

the logic comprising instructions that, when executed by the at least one processor, cause the at least one processor to:
receive a query relating to the task being performed by the user from the at least one user computing device:
determine a plurality of first responses to the query based on the content populated in the knowledge base:
determine whether at least one first response of the plurality of first responses is an appropriate answer to the query by:
calculating a score for each first response of the plurality of first responses;
comparing the calculated score to a preselected threshold; and
determining whether a first response of the plurality of first responses is an appropriate answer based on the comparison of the calculated score;
select a first response of the plurality responses to be a primary first response based on the calculated scores for the plurality of first responses;
provide the query to a third party information source upon a determination that the plurality of first responses do not provide an appropriate answer to the query:
receive a second response to the query from the third party information source;
select one of the primary first response or the second response using information provided by the third party information source by:
receiving a correlation coefficient from the third party information source, wherein the correlation coefficient is a value indicative of the relationship of the second response to the primary first response;
determining an updated score for the primary first response based on the correlation coefficient;
comparing the updated score to a second preselected threshold; and
selecting one of the primary first response or the second response to provide to the user based on the comparison of the updated score; and
provide the selected one of the primary first response or the second response to the user.

19. The system of claim 18, wherein the logic further comprises instructions that, when executed by the at least one processor, cause the at least one processor to provide the selected one of the first response of the plurality of first responses or the second response to a language model, wherein the language model converts the selected one of the first response of the plurality of first responses or the second response into a final response and provides the final response to the user.

20. The system of claim 19, wherein the logic further comprises instructions that, when executed by the at least one processor, cause the at least one processor to generate a moderation rate for the final response, wherein the moderation rate is a value indicative of whether the final response includes problematic content.

* * * * *